Feb. 19, 1963   M. NEISES   3,077,952
AXLE MECHANISM FOR INDUSTRIAL TRUCK
Filed Nov. 3, 1960   2 Sheets-Sheet 1

INVENTOR.
MATTHIAS NEISES
BY *J. C. Wiessler*
ATTORNEY

Feb. 19, 1963 M. NEISES 3,077,952
AXLE MECHANISM FOR INDUSTRIAL TRUCK
Filed Nov. 3, 1960 2 Sheets-Sheet 2

INVENTOR.
MATTHIAS NEISES
BY *Q. C. Wiessler*
ATTORNEY.

United States Patent Office 3,077,952
Patented Feb. 19, 1963

3,077,952
AXLE MECHANISM FOR INDUSTRIAL TRUCK
Matthias Neises, Mulheim, Germany, assignor to Ruhr Intrans Hubstapler, G.m.b.H., a registered German company
Filed Nov. 3, 1960, Ser. No. 67,128
Claims priority, application Germany July 23, 1960
4 Claims. (Cl. 187—9)

This invention relates to axle mechanism and more particularly to a device associated with a pivoted axle capable of selective association with the axle whereby to fix it in non-pivoted relation to a vehicle.

In certain types of vehicles, such as industrial lift trucks, it is common to utilize a rigid power train in which the drive axle is rigidly connected to the front portion of the chassis and supports a load lifting mast assembly which is journaled upon the axle and tiltable out of perpendicular relationship thereto. In such vehicles a steering axle is located at the rear end of the truck and is normally mounted upon a longitudinal central pivot shaft about which the axle may pivot in either direction. The industrial truck is thus supported on a three-point support formed by the two forward drive wheels and the pivot shaft of the steering axle. Use of the three-point support principle permits the steering axle to pivot in a vertical plane transverse to the direction of travel, and in traveling over uneven terrain continuous ground contact of the four wheels is assured with resulting desirable weight distribution on the various wheels. However, when, for example, the industrial truck is positioned out of a horizontal plane and the lifting mast is elevated to a substantial height the overall center of gravity comprising the combination of the individual centers of gravity of the upper part of the lifting mast, and any load carried thereby is shifted into the proximity of or over the side of a stability triangle which is formed by connecting the three supporting points. Stability of the truck is thereby reduced to such an extent that there is danger of the truck tipping over. The danger of tipping is further aggravated when, with the lifting mast raised and loaded, the mast is tilted back to prevent slipping of the load from the fork tines. The principles of stability in a lift truck having the abovementioned characteristics are discussed fully in U.S. Patent No. 3,003,254, dated October 10, 1961, and issued in the name of Jack E. Pattison.

Some lift trucks are used in which the steering axle is rigidly connected with the chassis the same as is the drive axle. This construction has the disadvantage that in driving over uneven terrain all of the wheels are not continuously in contact with the ground and the truck and driver are subjected to excessive stresses and strains during operation. The truck may also be subjected to severe impact shocks as single unsprung and non-pivoted wheels strike against irregularities in the terrain.

In another known construction of lift truck the dirigible wheels are borne not on a common steering axle, but individually in pivoted bogies equipped with vertically extending cylinders which are connected to one another by hydraulic compensating mechanism which becomes operative when the vehicle is inclined to the horizontal. The wheels may also be sprung from the vehicle in the sense that an elastic reservoir is provided in the compensating mechanism. Such a construction is unnecessarily complicated and difficult to manufacture. With inclinations of the industrial truck to the horizontal, the cylinder-piston actuators are eccentrically stressed which causes relatively frequent problems in maintenance.

The present invention is a significant improvement over such prior constructions in the use of pivoted steering axle construction which is selectively engageable and disengageable by mechanical or hydraulic locking means operable to lock the steering axle against pivotal movement by connecting it rigidly to the chassis during operation of the truck. In this manner the advantages attendant both upon use of a pivoted steering axle and a rigid steering axle are realized. When the locking mechanism is disengaged the truck may be operated over uneven terrain with the advantages attendant upon use of a pivoted axle and three-point suspension of the vehicle, whereas locking of the axle during load lifting operations of the mast increases greatly the stability of the truck by providing four-point support of the truck.

In the development of this invention is has also been found desirable to provide mechanism which is operable automatically under certain conditions to lock the steering axle against pivotal movement, and, as disclosed herein, such mechanism operates as a function of the elevation of the lift slide of the mast construction. When the lift slide exceeds a predetermined height reducing the stability of the truck, the steering axle is automatically rigidly connected with the chassis. It is automatically disconnected from its rigid association with the chassis upon lowering of the lift slide below the predetermined height.

It is therefore a primary object of the present invention to provide an improved axle construction for lift trucks and the like which may be selectively connected and disconnected with the chassis of the truck to provide either a three-point or four-point support of the truck.

An important object of the invention is to provide in a pivoted axle construction for vehicles, means for selectively locking and unlocking the pivoted axle from the chassis.

Another object of the invention is to provide automatically operable means connectible and disconnectible with a pivoted vehicle axle for forming a rigid connection between the vehicle chassis and the axle and for permitting pivotal movement of the axle relative to the chassis.

A further object of the invention is to generally improve steering axle construction for use with lift trucks and the like. Other objects, advantages and features of the present invention will appear in the following description when taken in conjunction with the drawings wherein.

Figure 1:
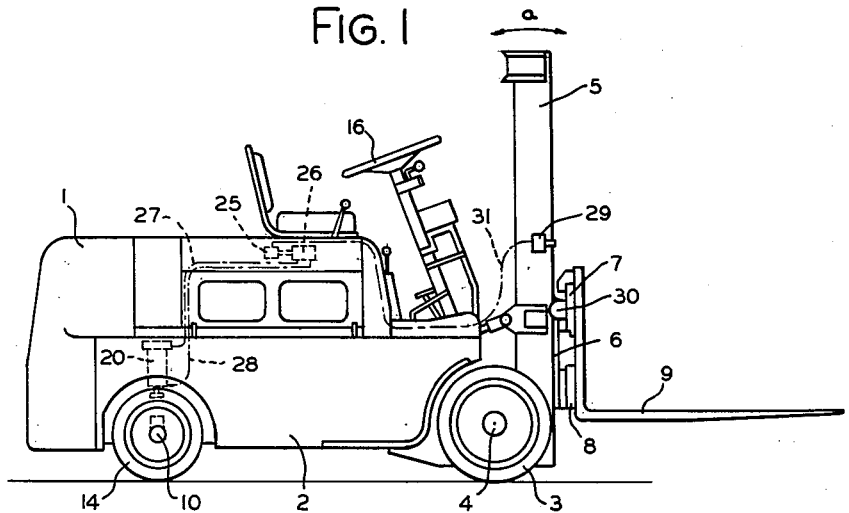
FIGURE 1 is a side elevational view of an industrial lift truck which embodies my invention.
Figure 2:
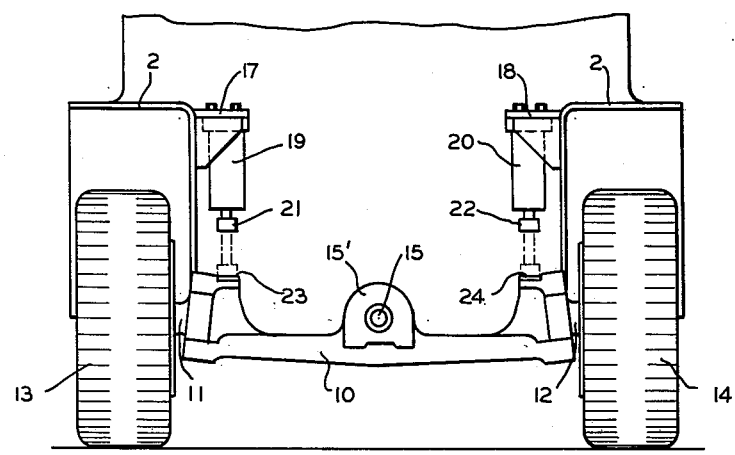
FIGURE 2 is an enlarged front view of the steering axle and wheels of the lift truck shown in FIG. 1.

Referring now in detail to FIGURES 1 and 2, an industrial lift truck 1 has a pair of forward drive wheels 3 mounted upon opposite ends of a drive axle 4 which is rigidly connected with the chassis 2 and upon which is journaled for forward and backward tilting movement in the directions of arrow *a* a lifting mast 5 of known construction. A lifting carriage 6 may be elevated in the mast 5, load engaging fork tines 9 being mounted upon carriage support plates 7 and 8.

In the rear portion of chassis 2 there is mounted a steering axle 10 which is normally pivotable in a vertical plane about the longitudinal axis of the vehicle, it being provided with dirigible wheels 13 and 14 mounted for pivoting movement on axle shank bolts 11 and 12. A pivot shaft or bearing 15 is supported from the chassis by a pair of longitudinally spaced bracket means 15', one of which is shown FIGURE 2 and supports the steering axle at an enlarged central portion thereof. Steering wheels 13 and 14 are operatively connected with an operator's steering wheel 16 by means of conventional steering linkage, not shown. Above steering axle 10 and transversely inwardly of the chassis 2 are mounted a pair of brackets 17 and 18, to which are secured a pair of downwardly extending hydraulic cylinder-piston assemblies 19 and 20 respectively. Piston rods 21 and 22 extend from the lower ends of the cylinders in vertically spaced relation from axle 10 when the piston rods are retracted, as shown in solid lines. When the piston rods are extended outwardly of the cylinders 19 and 20, as illustrated by the broken lines in FIGURE 2, they are driven into abutment with a pair of elevated axle pads 23 and 24 located at opposite ends of the axle 10. Such actuation of the piston rods has the effect of rigidly connecting the steering axle with the chassis of the truck so that it is unable to pivot in a vertical plane about shaft 15.

A hydraulic pump 26, (FIGURE 1) is mounted in the engine compartment of the truck and is equipped with a control valve 25 and connected to opposite ends of cylinders 19 and 20 by means of conduits 27 and 28. The control valve 25 is connected by means of a conduit 31 with a switch mechanism 29 mounted upon the outer side of mast construction 5 at a predetermined height. As illustrated, a dog 30 extends rearwardly of fork carriage 6 and is adapted to actuate switch 29 during vertical movement in either direction in the mast construction when dog 30 is located at the elevation of switch 29. Actuation of the switch by dog 30 causes the control valve 25 to shift its position, the shifting impulse to the control valve being preferably transmitted either electrically or hydraulically.

Assuming that carriage 6 is elevated until dog 30 operates switch 29, the switching impulse operates control valve 25 to initiate operation of pump 26, which directs pressure fluid through conduit 27 into the upper ends of cylinders 19 and 20. Piston rods or rams 21 and 22 are thereby extended to the positions indicated by the broken lines in FIGURE 2. In this position, as mentioned above, the enlarged ends of the piston rods press with considerable pressure against axle pads 23 and 24 for the purpose explained above. The hydraulic fluid which is exhausted from the cylinders returns to the inlet side of the pump through conduit 28. Upon lowering of the carriage 6 from a position above switch 29, the switching impulse again operates valve 25 upon movement of dog 30 into a switching position, which causes the pump 26 to pump pressure fluid through conduit 28 into the lower ends of cylinders 19 and 20 which retracts piston rods 21 and 22 into the solid the line position illustrated, whereupon the steering axle is again capable of pivotal movement about pivot shaft 15. During retraction of the piston rods the fluid which is expelled from the cylinders returns to the inlet side of the pump through conduit 27.

Figure 3:
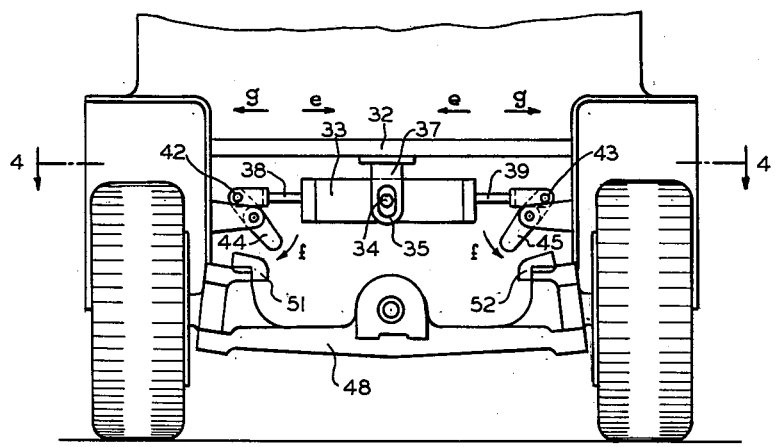
FIGURE 3 is an enlarged front elevational view of a modified construction of steering axle and wheels of the lift truck shown in FIGURE 1.
Figure 4:
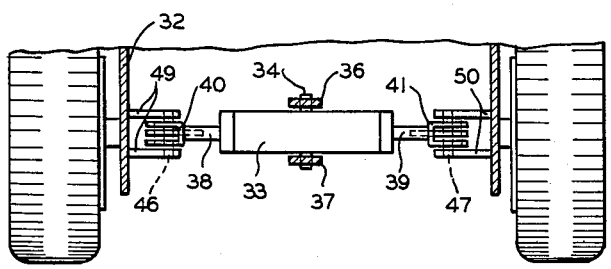
FIGURE 4 is a horizontal sectional view taken along line 4—4 in FIGURE 3.

In FIGURES 3 and 4 a modification is illustrated wherein a hydraulic cylinder assembly 33 extends transversely of the chassis above steering axle 48, being supported by bolt means 34 which extends from opposite sides of the cylinder and longitudinally of the vehicle. Bolt means 34 is supported in a pair of brackets 36 and 37 which depend downwardly from the chassis portion 32. The cylinder 33 is equipped with a pair of oppositely disposed pistons having piston rods 38 and 39 extending from opposite ends thereof and connected with a pair of bifurcated elements 40 and 41 which are connected with lever elements 44 and 45, respectively, by a pair of pin members 42 and 43. Lever elements 44 and 45 are mounted centrally thereof for pivotal movement about a pair of pin members 46 and 47 which support said elements in a pair of inwardly extending bifurcated brackets 49 and 50 secured to opposite sides of the chassis above the steering axle 48 and transverse to the longitudinal axis of the vehicle. Beneath the levers 44 and 45 are provided a pair of elevated axle pad portions 51 and 52.

A rigid connection between the steering axle 48 and the vehicle chassis 32 may be established by means of the switching mechanism, pump, control valve, and connecting conduits, similar to the arrangement illustrated in FIGURE 1, by introducing into cylinder 33 at opposite ends thereof pressure fluid which causes the piston rods 38 and 39 to retract in the directions of arrows e. This actuates levers 44 and 45 in opposite directions, as indicated by the arrows f, thus bringing the bottom portions of the lever elements into abutment with axle pad portions 51 and 52. Thus, axle 48 is prevented from pivoting about its central pivot shaft and four-point vehicle support is provided for maximizing vehicle stability.

In order to return the vehicle to a condition of three-point support, i.e., wherein the steering axle can pivot in its vertical plane, pressure fluid is introduced in the chamber of cylinder 33 formed between the piston heads of rods 38 and 39 whereby to extend the piston rods and actuate the lever elements 44 and 45 out of locking association with the axle pads 51 and 52 to the positions illustrated in FIGURE 3.

From the foregoing it will be appreciated that the present invention provides a relatively simple and unique mechanism for utilizing in a given vehicle under different conditions of operation either three or four-point vehicle support with the advantages attendant upon the selective use of both modes of vehicle support. Although only two embodiments have been disclosed and described in detail herein, it is not intended that the invention be limited to these exemplary showings thereof. For example, suitable mechanical actuating means can be used in place of the hydraulic cylinders disclosed, an,d, of course, it may be found feasible to operate the locking mechanism pneumatically rather than hydraulically. Also, instead of utilizing the automatic switch operating mechanism 29 and 30 it may be preferable in certain instances to utilize a switch which is operable at the selection of the operator. This latter mode of controlling the locking mechanism affords the advantage of operator selection of three or four-point vehicle support dependent upon the particular combination of operating conditions of the vehicle, such as the degree of elevation of the carriage 6, the tilted position of the mast 5, the mass of the load carried by the fork tines 9, the degree of incline, if any, upon which the truck is operating and whether it is operating transversely or longitudinally of such an incline, and other factors which in various combinations affect the relative degree of stability of the truck.

It should therefore be clearly understood that while I have shown and described what I believe to be preferred embodiments of my present invention, various rearrangements and modifications may readily be made therein without departing from the spirit and scope of my invention.

I claim:

1. In an industrial lift truck having a chassis, a load lifting mast provided at one end of the truck, a load engaging carriage means mounted on the mast for elevation therein and drive axle and wheel means associated rigidly with the chassis at said one end of the truck, a steering axle and wheel means located adjacent the opposite end of the truck, a longitudinally extending pivot shaft supported from the central portion of the chassis and supporting said steering axle and wheel means for pivotal movement in a vertical plane, a hydraulically actuated device supported from said chassis above said steering axle and operable to be actuated into and out of fixed said abutting relationship with opposite end portions of said steering axle including a horizontally extending cylinder construction depending from the chassis above the steering axle having opposed piston rods actuatable horizontally from opposite ends thereof and lock means connected to said piston rods for actuation thereby into and out of abutting relation with said opposite end portions of the steering axle.

2. An industrial lift truck as claimed in claim 1 wherein said lock means are pivotally mounted upon portions of said chassis to be actuated pivotally into and out of abutting relation with said steering axle means.

3. An industrial truck as claimed in claim 1 plus control means having a portion thereof mounted at a predetermined fixed elevation on said mast and operable to control said hydraulic device and lock means, said control means being operated by the load engaging carriage means above said fixed elevation to operate said lock means into abutment with the steering axle and being operated when the carriage means is below said fixed elevation to operate said lock means out of abutment with the steering axle.

4. In an industrial lift truck having a chassis, a load lifting mast provided at one end of the truck, a load engaging carriage means mounted on the mast for elevation therein, and drive axle and wheel means associated rigidly with the chassis at said one end of the truck, a steering axle and wheel means provided at the opposite end of the truck, pivot means supporting said steering axle for pivotal movement in a vertical plane, said pivot means being supported from the chassis and providing with said drive axle and wheels three-point support of the truck, means supported from the chassis and actuatable into abutment with said steering axle on opposite sides of said pivot means to effectively connect the steering axle rigidly with the chassis whereby to provide four-point truck support between the pairs of drive and steering axle wheels and actuatable out of abutment with said steering axle to provide three-point support between the pivot means and the drive axle wheels, and pump and control means operatively connected to said actuatable means for actuating the latter into and out of abutting relation with said steering axle, said control means including a device mounted at a predetermined fixed elevation on said mast and operable to control said pump and actuatable means, said device being operated by the load engaging carriage means at said fixed elevation and above to operate said actuatable means into abutment with the steering axle and being operated when the carriage means is below said fixed elevation to operate said actuatable means out of abutment with the steering axle.

References Cited in the file of this patent

UNITED STATES PATENTS

| | | |
|---|---|---|
| 729,737 | Collins | June 2, 1903 |
| 1,606,771 | Mitchell | Nov. 16, 1926 |
| 1,767,470 | Mitchell | June 24, 1930 |
| 2,073,823 | Anthony | Mar. 16, 1937 |
| 2,173,068 | Schroeder | Sept. 12, 1939 |
| 2,400,803 | Barnhart | May 12, 1946 |
| 2,477,789 | Dunham | Aug. 2, 1949 |
| 2,920,636 | Gassner | Jan. 12, 1960 |
| 2,935,161 | Comfort | May 3, 1960 |
| 2,991,890 | Kennedy | July 11, 1961 |
| 3,003,254 | Pattison | Oct. 10, 1961 |